(12) United States Patent
Lin

(10) Patent No.: US 7,970,265 B2
(45) Date of Patent: Jun. 28, 2011

(54) CONTROL SYSTEM AND METHOD FOR COMPENSATING FOR IMAGE SHAKE OF IMAGE CAPTURE DEVICE

(75) Inventor: Yi-Chang Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 91 days.

(21) Appl. No.: 12/430,958

(22) Filed: Apr. 28, 2009

(65) Prior Publication Data

US 2010/0067888 A1    Mar. 18, 2010

(30) Foreign Application Priority Data

Sep. 12, 2008 (TW) ............................... 97135149 A

(51) Int. Cl.
*G03B 17/00* (2006.01)
(52) U.S. Cl. ..................................... 396/55; 348/208.12
(58) Field of Classification Search ............. 348/208.12, 348/208.16; 396/55
See application file for complete search history.

(56) References Cited

U.S. PATENT DOCUMENTS

| | | | | |
|---|---|---|---|---|
| 5,850,575 A | * | 12/1998 | Ohishi | 396/52 |
| 5,940,630 A | * | 8/1999 | Washisu | 396/55 |
| 2007/0047936 A1 | * | 3/2007 | Hirota | 396/55 |
| 2008/0037980 A1 | * | 2/2008 | Okumura et al. | 396/535 |

FOREIGN PATENT DOCUMENTS

JP          09244131 A    *  9/1997

* cited by examiner

*Primary Examiner* — W. B. Perkey
*Assistant Examiner* — Leon W Rhodes
(74) *Attorney, Agent, or Firm* — Thomas | Kayden

(57) ABSTRACT

A control system for compensating for image shake of an image capture device is provided, including a shake compensating module, a shake compensating switch, a control unit, and a shutter control element operated between a first operating stage and a second operating stage. The shake compensating switch is switched between an active state to enable the shake compensating module and an inactive state to disable the shake compensating module. The control unit enables the shake compensating module when the shake compensating switch is in the active state. The control unit produces a reset signal to disable the shake compensating module when the shutter control element is in the second operating stage before the shake compensating switch is switched to the inactive state. The control unit enables the shake compensating module after a specific period of time from when the shake compensating module was disabled.

19 Claims, 4 Drawing Sheets

CONTROL SYSTEM AND METHOD FOR COMPENSATING FOR IMAGE SHAKE OF IMAGE CAPTURE DEVICE

CROSS REFERENCE TO RELATED APPLICATIONS

This Application claims priority of Taiwan Patent Application No. 097135149, filed on Sep. 12, 2008, the entirety of which is incorporated by reference herein.

BACKGROUND OF THE INVENTION

1. Field of the Invention

The invention relates in general to a control system and in particular to a control system for compensating for image shake of an image capture device.

2. Description of the Related Art

For conventional image capture devices, such as cameras, image blur usually occurs due to camera movement when breathing or pushing a shutter button. To suppress man-made vibrations, optical and electronic image shake suppressing technologies have been developed. In optical image shake suppressing technology, floating lenses may be applied in an optical system for shake compensation. In electronic image shake suppressing technology, processors or chips are provided to correct image blur due to camera vibrations when capturing images.

Conventional optical image shake suppressing modules usually include a detector, a corrector, and a driver. The detector detects vibration and transmits corresponding signals to the corrector, and the corrector calculates amplitude of the vibration. According to amplitude of the vibration, the driver actuates the floating lenses to compensate for the vibration. Additionally, another image shake suppressing technology may utilize a movable CCD to compensate for image blur.

Conventional image shake suppressing functions of a camera can be operated between a mode 1 or a mode 2. When the camera is in mode 1, the image shake suppressing function is enabled by pushing a switch button. To disable the image shake suppressing function, the user has to push the button again. When the image shake suppressing function is enabled for a long period of time, considerable power is consumed, thus adversely reducing power usage.

BRIEF SUMMARY OF INVENTION

The invention provides a control system and method for compensating for image shake of an image capture device. A shake compensating module of the image capture device is temporary disabled for a specific period of time and automatically re-enabled to suppress image blur, thus saving power and extending power usage.

An embodiment of the control system comprises a shake compensating module, a shake compensating switch, a shutter control element, and a control unit. The shake compensating switch is switched between an active state to enable the shake compensating module and an inactive state to disable the shake compensating module. The shutter control element is operated between a first operating stage and a second operating stage. The control unit is connected with the shake compensating switch, the shake compensating module, and the shutter control element. The control unit enables the shake compensating module when the shake compensating switch is in the active state. The control unit produces a reset signal to disable the shake compensating module when the shutter control element is in the second operating stage before the shake compensating switch is switched to the inactive state. The control unit enables the shake compensating module after a specific period of time from when the shake compensating module was disabled.

An embodiment of the control method comprises the following steps: enabling the shake compensating module; disabling the shake compensating module when the optical sensitive element loads data; and re-enabling the shake compensating module after a specific period of time from when the shake compensating module was disabled.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
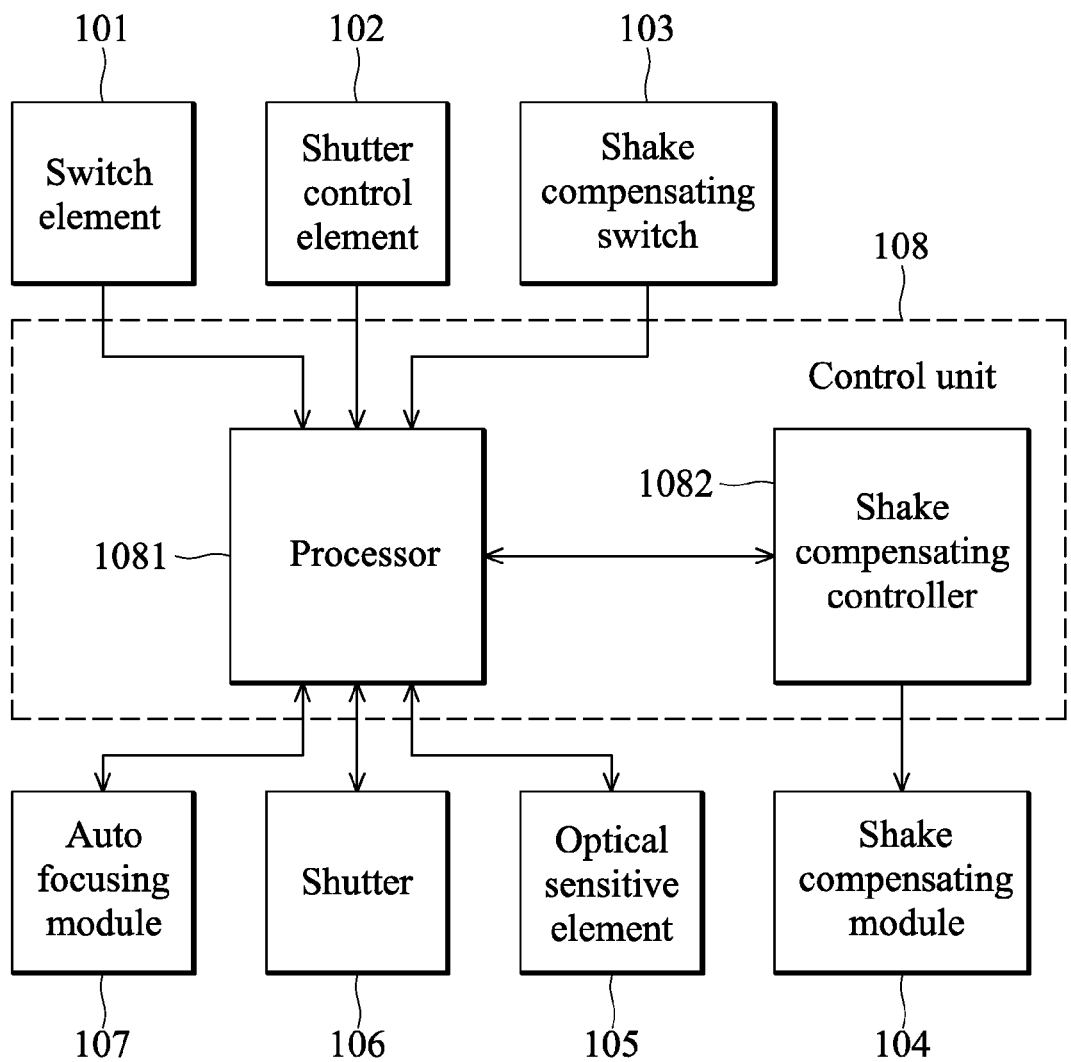
FIG. 1 is a perspective diagram of a control system for compensating for image shake of an image capture device in accordance with an embodiment of the invention.

Referring to FIG. 1, an embodiment of a control system for compensating for image shake of an image capture device primarily includes a switch element 101, a shutter control element 102, a shake compensating switch 103, a shake compensating module 104, an optical sensitive element 105, a shutter 106, an auto focusing module 107, and a control unit 108.

The switch element 101 is used to power on or off the image capture device. When the image capture device is powered on, the control unit 108 produces a shutter enable signal.

The shutter control element 102 is operated in a two-staged manner. In this embodiment, the shutter control element 102 is half-pressed when in a first operating stage, and is fully pressed when in a second operating stage.

The shake compensating switch 103 is switched between an active state and an inactive state, to alternatively enable or disable the shake compensating module 104. The shake compensating switch 103, such as a button, is switched to the active state when pressed by the first time, and is switched to the inactive state when pressed by the second time. In some embodiments, the shake compensating switch 103 may be a function dial in the active state when switched to the shake compensating mode, and in the inactive state when switched to the non-shake compensating mode.

The shake compensating module 104 is used for image shake compensation. Image shake compensation for the optical sensitive element 105 is executed according to amplitude and frequency of the vibration, thus preventing image blur due to camera vibration. In some embodiments, the optical sensitive element 105 may be a CCD or CMOS device exposed to light to transform light into electrical signals.

The shutter 106 is used to control exposure of the optical sensitive element 105. The shutter 106 opens when receiving a shutter enable signal, so as to expose the optical sensitive element 105. The shutter 106 closes when receiving a shutter disable signal, so as to disable exposure of the optical sensitive element 105.

The auto focusing module 107 is used for auto focusing of the image capture device. The auto focusing module 107 start focusing motion when receiving a focus enable signal, and the auto focusing module 107 stops focusing motion when receiving a focus disable signal.

The control unit 108 includes a processor 1081 and a shake compensating controller 1082. As shown in FIG. 1, the processor 1081 is coupled to the switch element 101, the shutter control element 102, the shake compensating switch 103, the optical sensitive element 105, the shutter 106, and the auto focusing module 107. The shake compensating controller 1082 is coupled to the processor 1081 and the shake compensating module 104.

When the switch element 101 is turned on, the image capture device is powered on, and the processor 1081 sends the shutter enable signal to enable the shutter 106 to open. Hence, the shutter 106 opens to make the optical sensitive element 105 exposed, while a live view function of the image capture device is also enabled.

When the shake compensating switch 103 is switched to the active state for image shake compensation, the processor 1081 sends a signal to the image shake compensating controller 1082 according to the active state of the shake compensating switch 103. Subsequently, the image shake compensating controller 1082 sends a shake compensating enable signal to enable the shake compensating module 104 to proceed with shake compensating function.

Before the shake compensating switch 103 switches to the inactive state and when the shutter control element 102 is in the first operating stage, the processor 1081 produces a focus enable signal to enable the auto focusing module 107 to proceed with focusing function according to the first operating stage of the shutter control element 102. When the shutter control element 102 is operated in the second operating stage, the control unit 108 sends a reset signal to erase image data of the optical sensitive element 105. Additionally, the live view function is disabled before the processor 1081 sends the reset signal.

After an exposure period following the optical sensitive element 105 receiving a reset signal, the processor 1081 sends a shutter disable signal to the shutter 106 to make the shutter 106 closed, and the optical sensitive element 105 starts loading image data for a loading period. After loading image data, the processor 1081 produces the shutter enable signal to enable the shutter 106 opened. Additionally, after a predetermined period following the processor 1081 producing the shutter enabling signal, the live view function is enabled again and restarted.

After sending the shutter enable signal to the shutter 106 for a specific period of time, the processor 1081 sends the image shake compensating enable signal to re-enable the shake compensating module 104, wherein the specific period is substantially equal to the loading period. In another embodiment, the specific period is substantially equal to the sum of the loading period and the predetermined period.

In some embodiments, the control unit 108 may re-enable the shake compensating module 104 at any time after loading image data and before restarting the live view function. The processor 1081 may comprise a digital signal processor (DSP). The shake compensating controller 1082 may comprise a digital signal processor (DSP), a microprocessor control unit (MCU), a single chip, a switch circuit, a field programmable gate array (FPGA), or a complex programmable logic device (CPLD). In some embodiments, the control unit 108 may be a digital signal processor (DSP).

Figure 2:
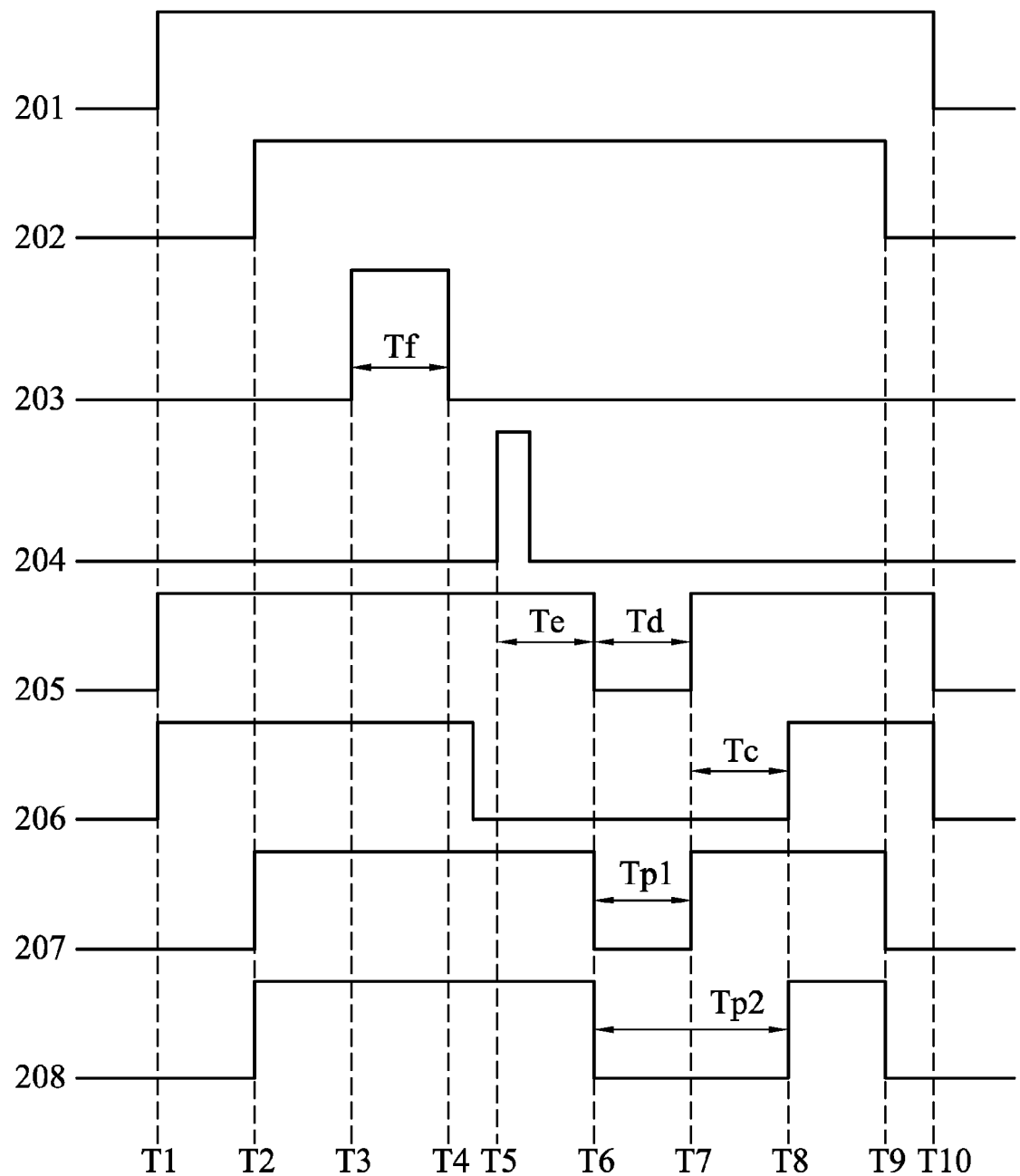
FIG. 2 is a timing sequence diagram of each element in FIG. 1.

FIG. 2 depicts a timing sequence diagram of each element in FIG. 1. Transition of the signal in FIG. 2 from low to high indicates that the element is switched from a disable/inactive state to an enable/active state. On the contrary, transition of the signal in FIG. 2 from high to low indicates that the element is switched from the enable/active state to the disable/inactive state.

Referring to FIG. 2, numeral 201 denotes status of the switch element 101, numeral 202 denotes status of the shake compensating switch 103, numeral 203 denotes status of the auto focusing module 107, numeral 204 denotes status of a reset signal for resetting the optical sensitive element 105, numeral 205 denotes status of the shutter 106, numeral 206 denotes status of the live view function, and numeral 207 denotes status of the shake compensating module 104.

At time T1, the image capture device is powered on, the switch element 101 switches to the active state, and the shutter 106 and the live view function is enabled.

At time T2, the shake compensating switch 103 and the shake compensating module 104 are enabled.

At time T3, the shutter control element 102 is half-pressed to the first operating stage, and the auto focusing module 107 is enabled.

At time T4, wherein the auto focusing module 107 enabled for an auto focusing period Tf, the auto focusing module 107 is disabled, and the live view function is disabled before time T5.

At time T5, the shutter control element 102 is fully pressed to the second operating stage, wherein the reset signal is activated for a short time and returns to its original state thereafter.

At time T6, after an exposure time Te from time T5, the shutter 106 and the shake compensating module 104 are disabled.

At time T7, after a specific period Tp1 from when the shake compensating module 104 was disabled, the shutter 106 opens, and the shake compensating module 104 is enabled, wherein the specific period Tp1 is substantially equal to the loading period Td.

At time T8, after a predetermined period Tc since the shutter 106 opens, the live view function is enabled.

At time T9, the shake compensating switch 103 is switched to the inactive state, and the shake compensating module 104 is disabled.

At time T10, the switch element 101 is turned off, and the shutter 106 and the live view function are disabled.

Numeral 208 in FIG. 2 depicts another embodiment of a timing sequence diagram of the shake compensating module 104. The difference between numeral 208 from numeral 207 is that the shake compensating module 104 is disabled for the specific period Tp2 from time T6 to T8. Specifically, the compensating module 104 is enabled from time T8 to T9, wherein the specific period Tp2 is substantially equal to the sum of the predetermined period Tc and the loading period Td.

Figure 3:
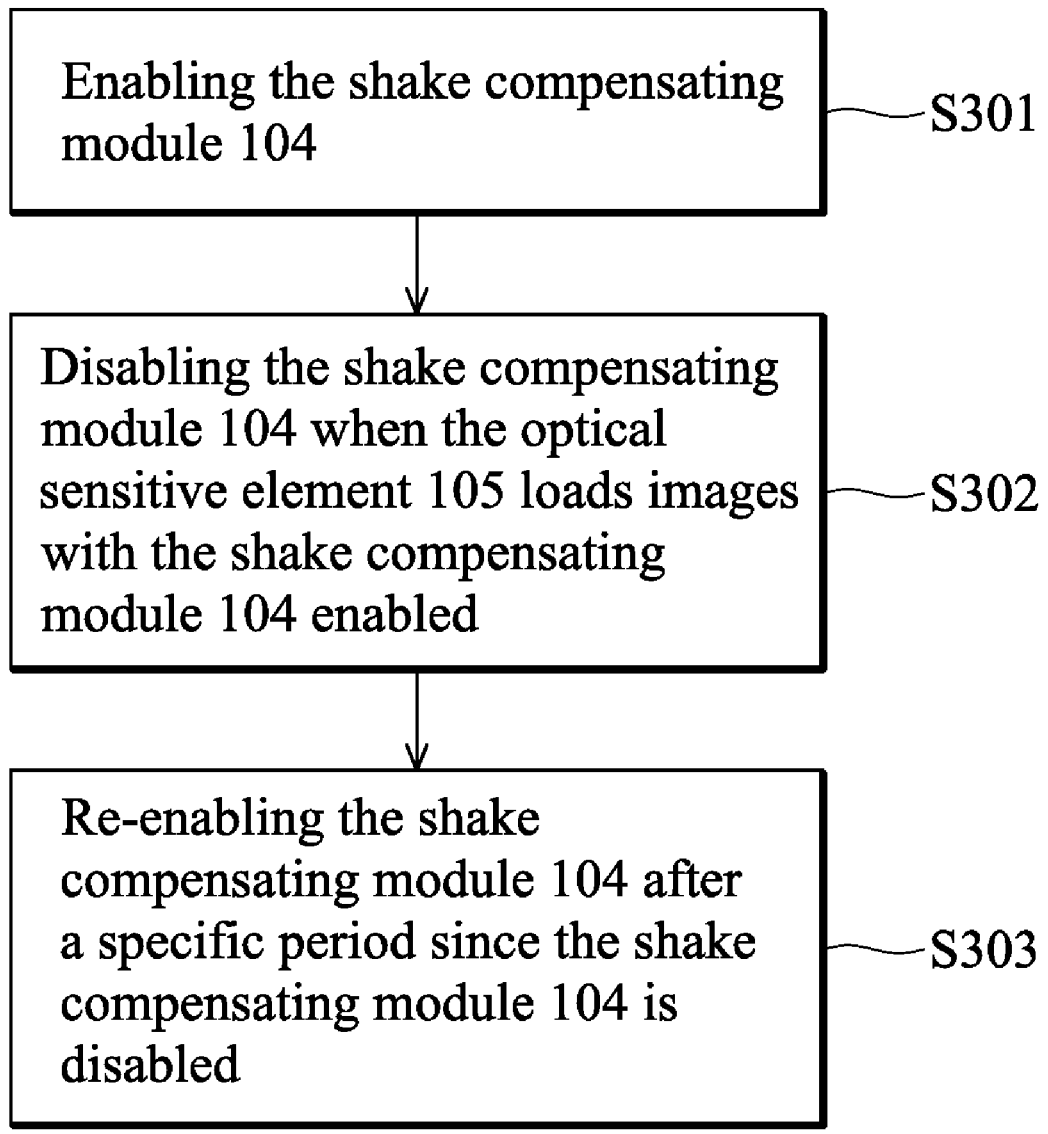
FIG. 3 is a flow chart of a control method for compensating for image shake of an image capture device in accordance with an embodiment of the invention.

FIG. 3 is a flow chart of a control method for compensating for image shake of an image capture device according to an embodiment of the invention. The image capture device primarily includes a switch element 101, a shutter control element 102, a shake compensating switch 103, a shake compensating module 104, an optical sensitive element 105, a shutter 106, an auto focusing module 107, and a control unit 108. The method comprises the following steps: enabling the shake compensating module 104 (step S301); disabling the shake compensating module 104 when the optical sensitive element 105 loads images with the shake compensating module 104 enabled (step S302); and re-enabling the shake compensating module 104 after a specific period from when the shake compensating module 104 was disabled (step S303).

Figure 4:
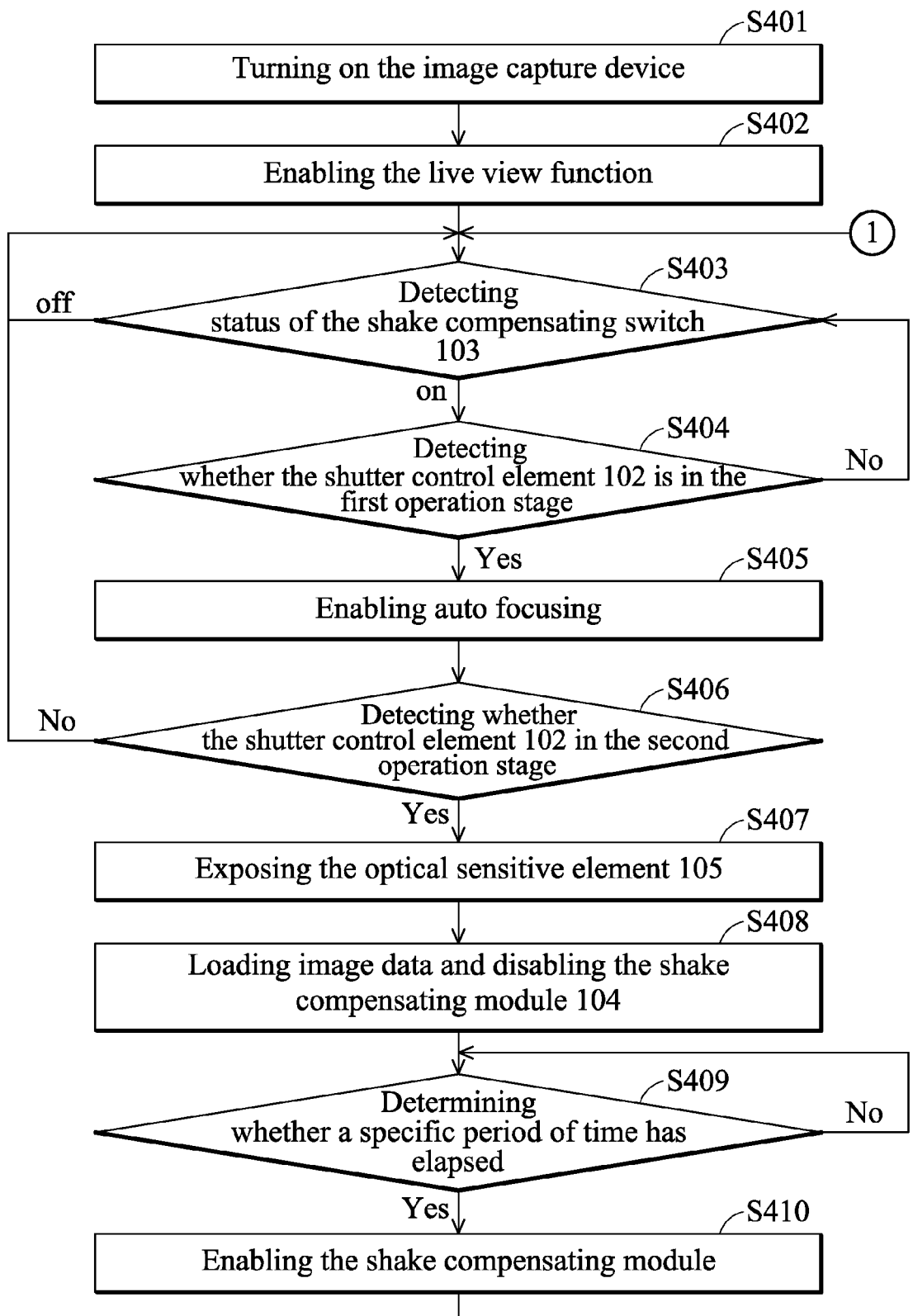
FIG. 4 is a detailed flow chart of a control method for compensating for image shake of an image capture device in accordance with an embodiment of the invention.

FIG. 4 is a detailed flow chart of a control method for compensating for image shake of an image capture device according to an embodiment of the invention. The method comprises the following steps.

Step S401 turns on the image capture device. In step S401, the switch element 101 is turned on, and then the control unit 108 sends a shutter enable signal to enable the shutter 106.

Step S402 enables the live view function. In step S402, the live view function is enabled for the image capture device.

Step S403 detects status of the shake compensating switch 103. In step S403, if the shake compensating switch 103 is in the active state, the image shake compensating controller 1082 sends a shake compensating enable signal to enable the shake compensating module 104 and then proceeds to step S404. On the contrary, if the shake compensating switch 103 is in the inactive state, the system continuously detects status of the shake compensating switch 103.

Step S404 detects whether the shutter control element 102 is in the first operating stage. In step S404, if the shutter control element 102 is in a first operating stage, the control unit 108 produces a focus enable signal to enable the auto focusing module 107 and then proceeds to step S405. If not, the procedure returns to step S403.

Step S405 enables auto focusing. In step S405, the auto focusing module 107 receives a focus enable signal to proceed with a focusing motion, and then proceeds to step S406.

Step S406 detects whether the shutter control element 102 in the second operating stage. In step S406, if the shutter control element 102 is in the second operating stage, the control unit 108 produces a reset signal and then proceeds to step S407, wherein the live view function is disabled before the control unit 108 produces the reset signal.

Step S407 exposes the optical sensitive element 105. In step S407, image data of the optical sensitive element 105 is erased and reset when receiving the reset signal. After the optical sensitive element 105 is exposed for an exposure period of time according to the reset signal, the control unit 108 produces a shutter disable signal and a shake compensating disable signal and then proceeds to step S408.

Step S408 loads image data and disables the shake compensating module 104. In step S408, the shutter 106 is disabled when receiving the shutter disable signal, and the shake compensating module 104 is disabled when receiving the shake compensating disable signal. Additionally, image data of the optical sensitive element 105 are loaded for a loading period of time. After loading image data, the control unit 108 produces the shutter enable signal to enable the shutter 106. After a predetermined period from when the processor 1081 produces the shutter enabling signal, the live view function is restarted and then proceeds to step S409.

Step S409 determines whether a specific period of time has elapsed. In step S409, if the specific period of time has elapsed from when the shake compensating module 104 was disabled, the control unit 108 sends the image shake compensating enable signal to re-enable the shake compensating module 104 (step 410) and then returns to step S403, wherein the specific period is substantially equal to the loading period. If the specific period of time has not elapsed from when the shake compensating module 104 was disabled, the system continues to check time in step S409.

In some embodiments, the specific period is substantially equal to the sum of the loading period and the predetermined period. In some embodiments, the control unit 108 may enable the shake compensating module 104 at any time after completing the loading process and before restarting the live view function.

According to the foresaid embodiments, the shake compensating module 104 is temporarily disabled when the optical sensitive element 105 captures images and loads data. Specifically, the shake compensating module 104 is automatically re-enabled when the loading process is completed, thus saving power of the image capture device. Additionally, since the shake compensating module 104 is disabled during the period of loading data, image quality is not affected. Hence, the invention not only saves power of the image capture device, but also extends time of usage without loss of image quality.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A control system for compensating for image shake of an image capture device, comprising:
    a switch element, powering on or off the image capture device;
    an optical sensitive element;
    a shutter, controlling exposure of the optical sensitive element; and
    an auto focusing module for auto focusing of the image capture device;
    a shake compensating module;
    a shake compensating switch switching between an active state to enable the shake compensating module and an inactive state to disable the shake compensating module;
    a shutter control element operating between a first operating stage and a second operating stage; and
    a control unit, connecting to the shake compensating switch, the shake compensating module, and the shutter control element,
    wherein the control unit enables the shake compensating module when the shake compensating switch is in the active state, and the control unit produces a reset signal to enable exposure of the shutter for an exposure time and then simultaneously disable the shutter and the shake compensating module when the shutter control element in the second operating stage before the shake compensating switch is switched to the inactive state;
    wherein the control unit re-enables the shake compensating module after a specific period of time from when the shake compensating module was disabled.

2. The control system as claimed in claim 1, wherein the control system further comprises a processor coupled to the shutter control element, the shake compensating switch, the auto focusing module, and the shutter, the control unit producing a shutter enable signal when the switch element powering on the image capture device, sending a shutter disable signal to control the shutter closed and a shutter enable signal to control the shutter opened, and sending a focus enable signal to proceed with a focusing motion and a focus disable signal to stop the focusing motion.

3. The control system as claimed in claim 2, wherein the focus enable signal is produced by the control unit when the shutter control element is in the first operating stage, and the control unit produces the focus disable signal after a focusing period of time from when the focus enable signal was produced.

4. The control system as claimed in claim 1, wherein the control unit comprises a processor and a shake compensating controller.

5. The control system as claimed in claim 4, wherein the shake compensating controller is coupled to the shake compensating module and the processor.

6. The control system as claimed in claim 4, wherein the processor comprises a digital signal processor (DSP), a microprocessor control unit (MCU), a single chip, a switch circuit, a field programmable gate array (FPGA), or a complex programmable logic device (CPLD).

7. The control system as claimed in claim 1, wherein the control unit produces a shake compensating disable signal to disable the shake compensating module when the shake compensating switch is in the active state.

8. The control system as claimed in claim 1, wherein the control unit produces a shake compensating enable signal to enable the shake compensating module after the specific period of time from when the shake compensating module was disabled.

9. The control system as claimed in claim 1, wherein the shake compensating module is re-enabled and the shutter opens at the same time.

10. The control system as claimed in claim 1, wherein the specific period is a period of time after disabling the shutter to restarting a live view function of the image capture device.

11. The control system as claimed in claim 1, wherein the shutter control element is half-pressed when in the first operating stage, and is fully pressed when in the second operating stage.

12. A control method for compensating for image shake of an image capture device, wherein the image capture device comprises a switch element, a shutter control element, a shake compensating switch, a shake compensating module, an optical sensitive element, a shutter, an auto focusing module, and a control unit, comprising:
  A. enabling the shake compensating module;
  B. disabling the shutter and the shake compensating module simultaneously when the optical sensitive element loads data; and
  C. re-enabling the shake compensating module after a specific period of time from when the shake compensating module was disabled.

13. The control method as claimed in claim 12, wherein the step A further comprises:
  enabling the shake compensating module by a shake compensating enable signal from the control unit when the shake compensating switch is in an active state.

14. The control method as claimed in claim 12, wherein the step B further comprises:
  producing a focus enable signal when the shutter control element is in a first operating stage;
  proceeding with focusing of the image capture device when the auto focusing module receives the focus enable signal;
  producing a reset signal by the control unit when the shutter control element is in a second operating stage after focusing of the image capture device;
  exposing the optical sensitive element for an exposure period of time from when the optical sensitive element receives the reset signal, wherein the control unit produces a shutter disable signal and a shake compensating disable signal after exposure of the optical sensitive element; and
  disabling the shutter when the shutter receives the shutter disable signal and disabling the shake compensating disable module when the shake compensating module receives the shake compensating disable signal.

15. The control method as claimed in claim 12, wherein the step C further comprises:
  re-enabling the shake compensating module after the specific period of time from when the shake compensating module was disabled, wherein the control unit produces the shake compensating enable signal.

16. The control method as claimed in claim 14, wherein the control unit disables a live view function before producing the reset signal.

17. The control method as claimed in claim 12 or 15, wherein the specific period is substantially equal to a loading period of the optical sensitive element.

18. The control method as claimed in claim 12 or 15, wherein the shake compensating module is re-enabled and the shutter opens at the same time.

19. The control method as claimed in claim 14, wherein the specific period is a period of time from disabling the shutter to restarting the live view function.

* * * * *